(No Model.) 2 Sheets—Sheet 1.

J. W. CARTER & J. MILLER.
GAS PRESSURE REGULATOR.

No. 390,568. Patented Oct. 2, 1888.

(No Model.) 2 Sheets—Sheet 2.

J. W. CARTER & J. MILLER.
GAS PRESSURE REGULATOR.

No. 390,568. Patented Oct. 2, 1888.

WITNESSES:
Fred G. Dieterich
Wm McMister

INVENTOR
J. W. Carter
J. Miller
BY
Munn & Co
ATTORNEY

United States Patent Office.

JOHN WESLEY CARTER AND JOSEPH MILLER, OF GREENFIELD, INDIANA; SAID MILLER ASSIGNOR TO WINFIELD S. GANT, OF SAME PLACE.

GAS-PRESSURE REGULATOR.

SPECIFICATION forming part of Letters Patent No. 390,568, dated October 2, 1888.

Application filed April 27, 1888. Serial No. 272,077. (No model.)

*To all whom it may concern:*

Be it known that we, JOHN WESLEY CARTER and JOSEPH MILLER, of Greenfield, in the county of Hancock and State of Indiana, have invented a new and useful Improvement in Gas-Pressure Regulators, of which the following is a specification.

This invention pertains to certain improvements in gas-pressure regulators, which are also adapted to serve as steam or liquid pressure regulators, having especially for its object to reduce to a minimum the pressure in the service-pipe; and to these ends the invention consists of the means whereby the supply-valve is automatically opened and closed, which operation is effected with great expedition, and of the particular construction of the supply-valve and its seat, including certain other details of construction, substantially as hereinafter more fully set forth, and pointed out in the claims.

Figure 1:
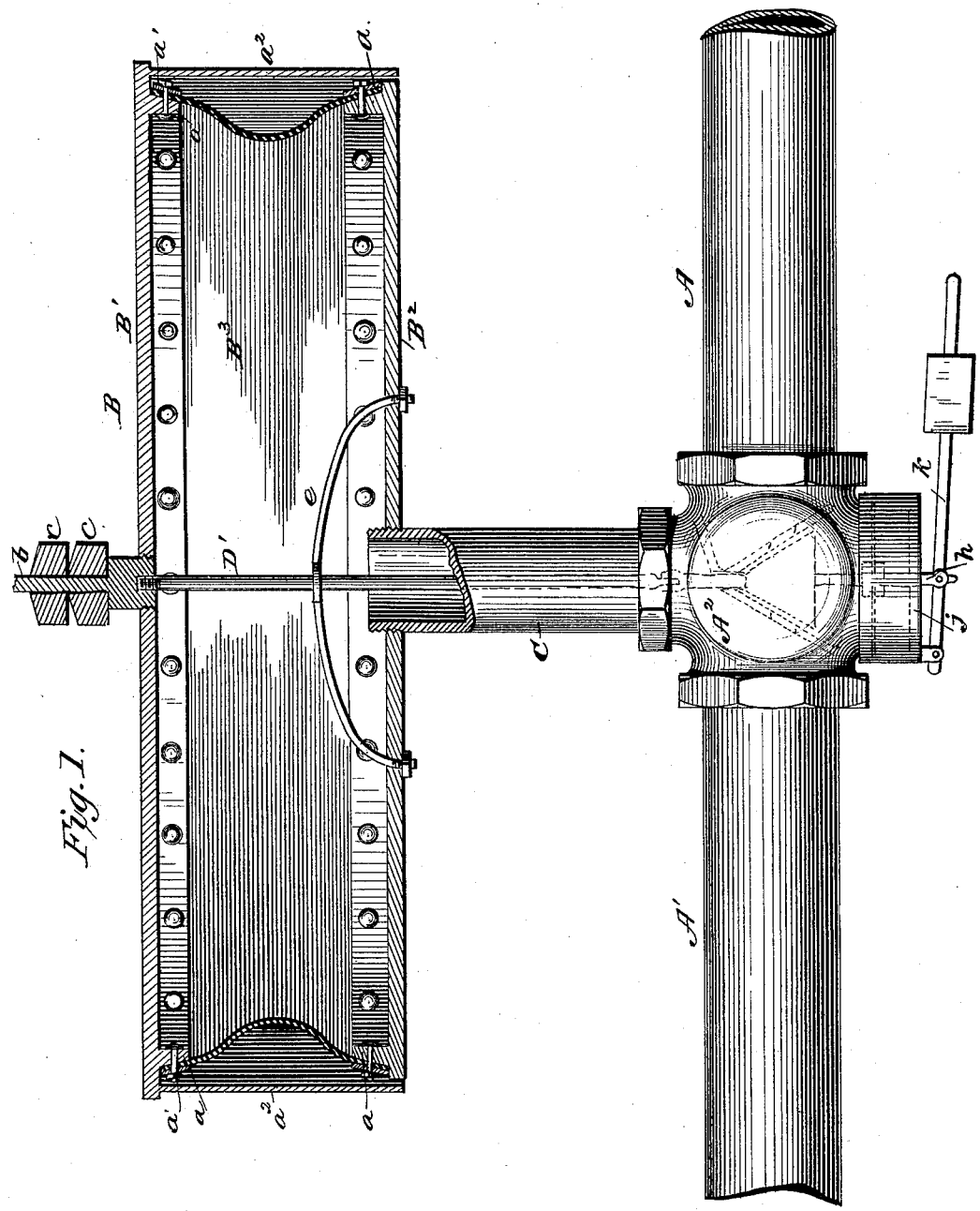
Figure 2:
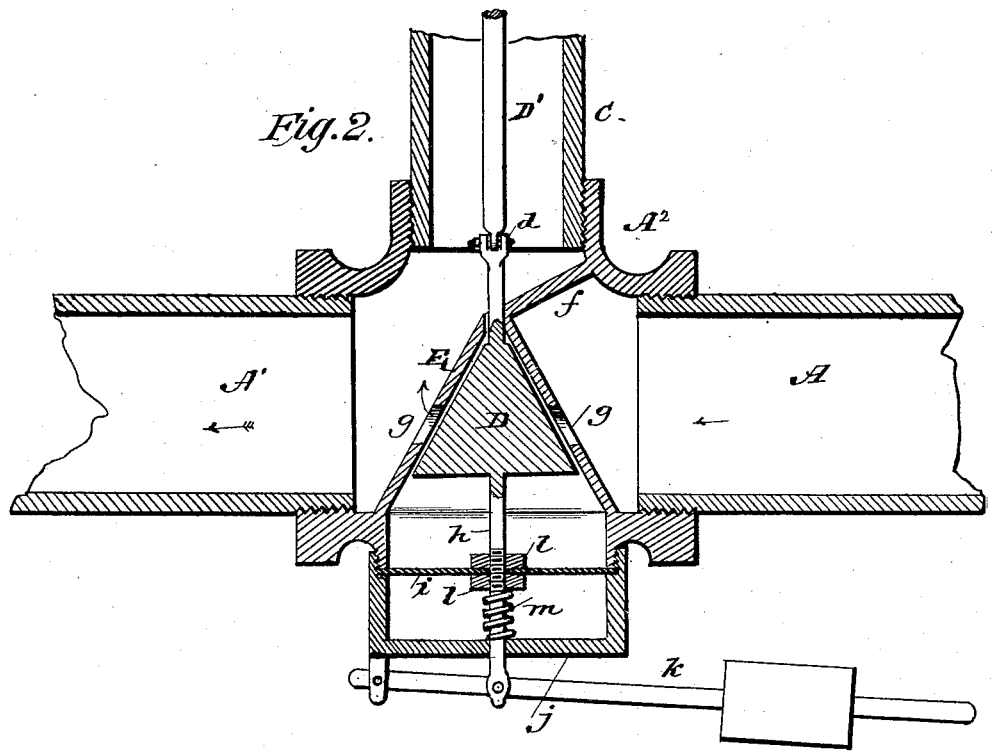
Figure 3:
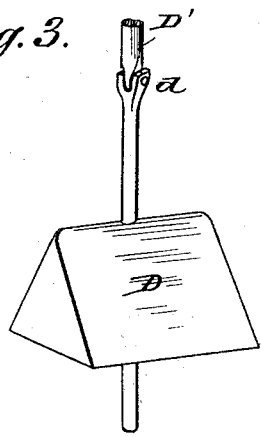
Figure 4:
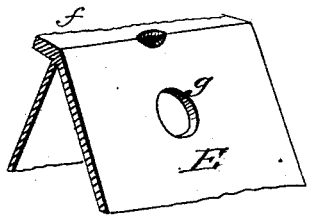

In the accompanying drawings, Figure 1 is a partly sectional and side elevation of our invention, and Figs. 2, 3, and 4 are enlarged detail views thereof.

In the embodiment of our invention we employ, as usual, a high-pressure pipe, A, and low-pressure pipe A', which are connected or united to a T-pipe coupling, A².

B is a bellows, which comprises two metal plates, B' B², an upper and a lower one, and the rubber or elastic sides B³, secured to the plates in any suitable way, preferably, as shown, by fitting the rubber or elastic material forming said sides to flanges $a\ a$ upon said plates, and then driving upon the same bands or rings $a\ a$ and riveting the whole together.

To the upper plate, B', of the bellows B is applied a downwardly-projecting plate or flange, $a^2$, surrounding and protecting the elastic or rubber sides of the bellows. Centrally of the upper side of the upper plate, B', of the bellows B is applied a standard or rod, $b$, being preferably enlarged at its lower end and having a screw-threaded connection with said plate at said end. This standard or rod serves as a means for holding weights, of which two, $c\ c$, are shown placed thereon for weighting the bellows. The T-pipe coupling A² has connection with a pipe, C, connecting with the lower plate, B², of the bellows B.

D is the supply-valve, which is preferably of an approximately inverted-wedge shape, having its stem projecting from its apex or upper edge and loosely coupled or jointed, as at $d$, to a rod, D', which reaches up through the pipe C and bellows B, and is screwed into a screw-threaded socket in the under side of the enlarged lower end of the standard or rod $b$. The rod D' also passes through and is guided in an upwardly-bowed bar or guide, $e$, the ends of which pass through and are suitably held to the bottom or lower plate, B², of the bellows B, it may be by nuts. The valve D is fitted in the under side of the correspondingly-shaped seat E, cast or formed with and upon the inside of the T coupling-pipe A², its divergent ends spanning the lower open end of the pipe-coupling, while at its upper end or apex and at its side edges next to the supply or high-pressure pipe A it is connected with the said coupling by an extension, $f$, thereof, closing that end of said pipe. The valve-seat D is formed or provided in its sides with coincident ports or passages $g\ g$, which are opened and closed by means of the valve D.

From the lower side or base of the valve D depends a rod or pendant, $h$, which extends down through an elastic diaphragm, $i$, and a cap, $j$, its extreme lower end being connected to a weighted lever, $k$, pivoted to one edge of the cap $j$. By this arrangement the valve is further weighted. The cap $j$ is screwed upon the lower open end of the pipe-coupling A², and between the same is held the elastic diaphragm $i$, while the diaphragm is held at its center to the rod or pendant $h$ by nuts $l$, screwed upon the latter, one upon each side of the diaphragm.

Upon the rod $h$ is placed a spring, $m$, interposed between the lower nut, $l$, and the cap $j$, to aid the action of the diaphragm.

The loose joint or coupling connection $d$ between the valve stem and rod D' permits of the ready seating of the valve, irrespective of its exact alignment with said rod, and the valve to have a limited independent movement, whereby it is enabled to snugly or closely seat itself and allow of the movement of the bellows under the action of the least pressure.

It will be seen that upon turning on the gas to the burners or to a stove—as, for instance, in using as a fuel natural gas—the pressure in the bellows or receiver B will be lessened by the outflowing gas from the low-pressure pipe A', previously backed up therein and in the expansible and collapsible receiver or bellows. The valve D will now descend, uncovering or opening the ports or passages $g$ $g$ in the valve-seat E, permitting the gas to flow from the high-pressure pipe A through the ports or passages, a portion of the gas flowing into the bellows or receiver through the pipes $A^2$ and C, and a portion flowing into the low-pressure pipe A', replenishing or keeping up the supply to the burners or stove, or both, as the case may be.

It will be seen from what has just been stated that upon turning or cutting off the gas from the burners or stoves the gas-pressure will instantly back up in and expand the bellows or receiver, which will at once elevate the valve and close the ports or passages $g$ $g$.

This regulator, it is apparent, is equally applicable for regulating steam and water or liquid pressure, while it dispenses with the use of a waste or blow-off pipe in reducing the pressure in the service or house pipes after the cutting off of the gas from the burners or stoves, as heretofore adopted.

It will be understood that we do not limit or restrict ourselves to the details of construction of the various parts, as herein shown and described, as these may be varied, as may also the arrangement of the parts, so as to effect the seating of the valve from above as well as from below without departing from the spirit of our invention.

Having thus described our invention, what we claim as new is—

1. In a pressure-regulator, the combination, with the bellows or receiver, its feeding-pipe, the high and low pressure pipes, and the valve having its stem connecting with the bellows or receiver, of the coupling having the approximately inverted-wedge-shaped valve-seat, the divergent ends of which span the lower open end of said coupling, while the apex of said valve-seat has an extension connecting with the coupling around the inlet-opening thereof, said seat having in its sides opposite openings, and between which sides fits the valve, substantially as described.

2. In a pressure-regulator, the combination, with the high and low pressure pipes, the bellows, and pipe-coupling connecting said pipes and with a pipe connected to said bellows, of the supply-valve and its seat, said valve connecting by a rod with the bellows and having a pendent rod or stem connected with a weighted lever, substantially as specified.

3. In a pressure-regulator, the bellows or expansible and contractible receiver for actuating the supply-valve, said receiver or bellows comprising plates provided with flanges, the elastic sides and bands or rings securing said sides in place upon said flanges, one of which plates is provided with a pendent flange surrounding and protecting said elastic sides, substantially as specified.

4. In a pressure-regulator, the combination of the bellows or receiver and the valve and its seat, said valve being connected to said receiver or bellows and provided with a pendent stem or rod passing through and held by nuts to an elastic diaphragm, the high and low pressure pipes, a pipe-coupling connecting said pipes together, an additional pipe connecting said coupling to said bellows, the cap applied to the lower end of the pipe-coupling, and the weighted lever connected to said pendent stem of the valve, substantially as set forth.

JOHN WESLEY CARTER.
JOSEPH MILLER.

Witnesses:
GEO. BIXLER,
JOHN MILLER.